United States Patent
Vulgarakis Feljan et al.

(10) Patent No.: US 12,231,711 B2
(45) Date of Patent: Feb. 18, 2025

(54) MEDIA CONTENT INSERTION IN A VIRTUAL ENVIRONMENT

(71) Applicant: Telefonaktiebolaget LM Ericsson (publ), Stockholm (SE)

(72) Inventors: Aneta Vulgarakis Feljan, Stockholm (SE); Kaushik Dey, Kolkata (IN); Marin Orlic, Bromma (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 18/013,890

(22) PCT Filed: Jul. 3, 2020

(86) PCT No.: PCT/EP2020/068874
§ 371 (c)(1),
(2) Date: Dec. 29, 2022

(87) PCT Pub. No.: WO2022/002415
PCT Pub. Date: Jan. 6, 2022

(65) Prior Publication Data
US 2023/0291952 A1 Sep. 14, 2023

(51) Int. Cl.
*H04N 21/2668* (2011.01)
*A63F 13/61* (2014.01)
(Continued)

(52) U.S. Cl.
CPC ......... *H04N 21/2668* (2013.01); *A63F 13/61* (2014.09); *A63F 13/79* (2014.09);
(Continued)

(58) Field of Classification Search
CPC .......... H04N 21/2668; H04N 21/2402; H04N 21/254; H04N 21/25883; H04N 21/42201; H04N 21/812; A63F 13/61; A63F 13/79
See application file for complete search history.

(56) References Cited

U.S. PATENT DOCUMENTS

2008/0276270 A1* 11/2008 Kotaru ............... H04N 21/2668
725/34
2012/0227064 A1    9/2012 Neill
(Continued)

OTHER PUBLICATIONS

International Search Report and Written Opinion with Transmittal dated Mar. 29, 2021 in International Application No. PCT/EP2020/068874 (20 pages).
(Continued)

*Primary Examiner* — Nnenna N Ekpo
(74) *Attorney, Agent, or Firm* — Rothwell, Figg, Ernst & Manbeck, P.C.

(57) ABSTRACT

A method performed by a content server (100) for determining additional media content to be inserted into a main media content wherein the main media content is in a virtual environment, the method comprising: acquiring (S201) information relating to a user profile of each of a plurality of users that are viewing the main media content; clustering (S202) the plurality of users into one or more user clusters based on the user profile of each of the plurality of users; acquiring (S203) a viewing state of each of the plurality of users that are viewing the main media content, wherein the viewing state of each of the plurality of users comprises biometric data of each of the plurality of users; acquiring (S204) information relating to a network quality; and determining (205) the additional media content for each of the plurality of users by a first reinforcement learning agent
(Continued)

based on the one or more user clusters, the viewing state of each of the plurality of users, and the network quality.

23 Claims, 7 Drawing Sheets

(51) Int. Cl.
*A63F 13/63* (2014.01)
*A63F 13/79* (2014.01)
*H04N 21/24* (2011.01)
*H04N 21/254* (2011.01)
*H04N 21/258* (2011.01)
*H04N 21/422* (2011.01)
*H04N 21/81* (2011.01)

(52) U.S. Cl.
CPC ....... *H04N 21/2402* (2013.01); *H04N 21/254* (2013.01); *H04N 21/25883* (2013.01); *H04N 21/42201* (2013.01); *H04N 21/812* (2013.01); *A63F 2300/8082* (2013.01)

(56) References Cited

U.S. PATENT DOCUMENTS

| | | | |
|---|---|---|---|
| 2019/0012839 A1* | 1/2019 | Wang | H04N 19/00 |
| 2020/0145723 A1* | 5/2020 | Vaughn | H04N 21/25883 |
| 2020/0304885 A1* | 9/2020 | Ickin | H04N 21/4622 |
| 2021/0312502 A1* | 10/2021 | Goodsitt | G06N 20/00 |
| 2022/0303639 A1* | 9/2022 | Park | H04N 21/4312 |

OTHER PUBLICATIONS

Li, G., et al., "Facial feedback for reinforcement learning: a case study and offline analysis using the TAMER framework", Autonomous Agents and Multi-Agent Systems, Kluwer Academic Publishers, Dordrecht, US, vol. 34, No. 1, Feb. 12, 2020, XP037109867, DOI: 10.1007/SI0458-020-09447-W (29 pages).

Zhao, X., et al., "Deep Reinforcement Learning for Search, Recommendation, and Online Advertising: A Survey", Feb. 15, 2019, arXiv: 1812.07127v3 [cs.IR], Cornell University Library, Ithaca, NY, XP081023007 (15 pages).

* cited by examiner

400

S401
Acquiring information relating to a user profile of at least one user that is viewing the main media content

S402
Acquiring a viewing state of the at least one user, wherein the viewing state of the at least one user comprises biometric data of the at least one user

S403
Acquiring information relating to a network quality

S404
Receiving a determination of the additional media content for the at least one user

S405
Acquiring the additional media content

S406
Determining a position and a time slot to insert the additional media content into the main media content by a second reinforcement learning agent based on the viewing state of the at least one user, the user profile of the at least one user that is viewing the main media content and the network quality

Fig. 4

MEDIA CONTENT INSERTION IN A VIRTUAL ENVIRONMENT

CROSS REFERENCE TO RELATED APPLICATIONS

This application is a 35 U.S.C. § 371 National Stage of International Patent Application No. PCT/EP2020/068874, filed Jul. 3, 2020.

TECHNICAL FIELD

Embodiments presented herein relate to a method, a content server, a computer program, a computer program product and a carrier for determining an additional media content to be inserted into a main media content wherein the main media content is in a virtual environment. Furthermore, embodiments presented herein relate to a method, an edge node, a computer program, a computer program product and a carrier for inserting an additional media content into a main media content wherein the main media content is in a virtual environment.

BACKGROUND

In recent years, producers and distributors of content are looking for new ways to add value to provided content and to monetize the content. End-users will typically find more added value and be more receptive to an additional media content (such as advertisement) that is related to a main media content (such as movies, games, television programs) being displayed on a media system. Furthermore, end-users will normally be more receptive to the additional media content if it is targeted to every specific user and is merged with the provided main media content in an immersive way providing a pleasant user experience.

Currently, the user experience when viewing/listening the additional media content needs to be improved. For an end-user that is playing a game for example, the additional media content is typically inserted at random time points and positions of the game and often in a disruptive manner. In an Augmented Reality (AR)/Virtual Reality (VR) environment this disruptive effect is further amplified. When watching a movie in the AR/VR environment there are rarely any additional media content. Because the movie is normally pre-recorded and inserting the additional media content may result in pausing the movie and jumping to the additional media content.

There is also a concern about latency which is an end-to-end measurement of time delay, especially when the main media content is served from an edge server. For a gaming environment, for example, latency is very important. The ability to control a game character to attack or evade within a limited period of time may determine if the user is able to win or lose the game. Therefore, to deliver a final media content where the additional media content is merged in a streaming audio and/or video to the end-user in a timely manner is challenging.

Hence, there is still a need for better user experience when inserting additional media content.

SUMMARY

According to a first aspect of the invention there is presented a method for determining an additional media content to be inserted into a main media content wherein the main media content is in a virtual environment. The method is performed by a content server. The method comprises acquiring information relating to a user profile of each of a plurality of users that are viewing the main media content; clustering the plurality of users into one or more user clusters based on the user profile of each of the plurality of users; acquiring a viewing state of each of the plurality of users that are viewing the main media content, wherein the viewing state of each of the plurality of users comprises biometric data of each of the plurality of users; acquiring information relating to a network quality; and determining the additional media content for each of the plurality of users by a first reinforcement learning agent based on the one or more user clusters, the viewing state of each of the plurality of users, and the network quality.

According to a second aspect of the invention there is presented a method for inserting an additional media content into a main media content wherein the main media content is in a virtual environment. The method is performed by an edge node. The method comprises: acquiring information relating to a user profile of at least one user that is viewing the main media content; acquiring a viewing state of the at least one user, wherein the viewing state of the at least one user comprises biometric data of the at least one user; acquiring information relating to a network quality; receiving a determination of the additional media content for the at least one user; acquiring the additional media content; and determining a position and a time slot to insert the additional media content into the main media content by a second reinforcement learning agent based on the viewing state of the at least one user, the user profile of the at least one user that is viewing the main media content and the network quality.

According to a third aspect of the invention there is presented a content server for determining an additional media content to be inserted into a main media content wherein the main media content is in a virtual environment. The content server comprises a processing circuitry causing the content server to be operative to: acquire information relating to a user profile of each of a plurality of users that are viewing the main media content; cluster the plurality of users into one or more user clusters based on the user profile of each of the plurality of users; acquire a viewing state of each of the plurality of users that are viewing the main media content, wherein the viewing state of each of the plurality of users comprises biometric data of each of the plurality of users; acquiring information relating to a network quality; and determining the additional media content for each of the plurality of users by a first reinforcement learning agent based on the one or more user clusters, the viewing state of each of the plurality of users, and the network quality.

According to a fourth aspect of the invention there is presented an edge node for inserting an additional media content into a main media content wherein the main media content is in a virtual environment. The edge node comprises a processing circuitry causing the edge node to be operative to: acquire information relating to a user profile of at least one user that is viewing the main media content; acquire a viewing state of the at least one user, wherein the viewing state of the at least one user comprises biometric data of the at least one user; acquire information relating to a network quality; receive a determination of the additional media content for the at least one user; acquire the additional media content; and determine a position and a time slot to insert the additional media content into the main media content by a second reinforcement learning agent based on the viewing state of the at least one user, the user profile of the at least one user that is viewing the main media content and the network quality.

According to a fifth aspect of the invention there is presented a computer program comprising instructions which, when executed on a processing circuitry, cause the processing circuitry to perform the method of the first aspect or the method of the second aspect.

According to a sixth aspect of the invention there is presented a computer program product comprising a computer readable storage medium on which a computer program according to the fifth aspect, is stored.

According to a seventh aspect of the invention there is a carrier containing the computer program according to the fifth aspect, wherein the carrier is one of an electronic signal, an optical signal, a radio signal, and a computer readable storage medium.

As used herein, "media content" may refer generally to any content accessible via a media content access device. "media content" may refer to any television program, on-demand media program, pay-per-view media program, broadcast media program (e.g., broadcast television program), multicast media program (e.g., multicast television program), narrowcast media program (e.g., narrowcast video-on-demand program), IPTV media content, advertisement (e.g., commercial), video, movie, song, image, photograph, sound, or any segment, component, or combination of these or other forms of media content that may be processed by a media content access device for experiencing by a user.

Advantageously, these aspects provide a way of inserting the additional media content that is better targeted to a specific user.

Advantageously, these aspects provide a way of inserting the additional media content that improves user experience.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 4 is a flowchart of a method for inserting an additional media content into a main media content, according to an embodiment of the invention;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description of the figures. Any step or feature illustrated by dashed lines should be regarded as optional.

Additional media content may be added to the main media content in an immersive way, where content providers prepare the main media content with extra "content landing (advertising) slots", wherein a content landing slot of the main media content is a two-dimensional (2D) or three-dimensional (3D) area where an advertisement loads.

Figure 1:
FIG. 1 illustrates inserting an additional media content into a scene of a film.

FIG. 1 illustrates an example of a content landing slot within a movie (that is Casino Royale, 2006 film). The content landing slot is located at the laptop beside film role James Bond, and the content landing slot can accept static images and is intended for laptop product logos.

For TV shows or movies, the content landing slot may be a customized additional content to be inserted into a commercial slot.

For a Virtual Reality (VR) movie or an Augmented Reality (AR)/VR game, the content landing slot may be an immersed slot that receives a video overlay to show an advertisement. The video overlay is an image or animation that plays on top of and concurrently with the video content. The video overlay is typically at the bottom of a screen without interrupting the video being watched. The video overlay advertisement may mask the video content and may be at least partly transparent. The content landing slot may be an immersed slot that receives a 3D model rendered to show a product placement, for example a table that can accept products that are placed on top of it. The content landing slot may be a location in the movie/game that can play additional audio content.

Network may have a fixed load budget and may only provide a limited number of additional media content to users without affecting the quality of the main media content or the quality of the network itself. How to optimize this provision targeting the user experience? As an example, it is preferred to push the advertisement when the user is able to comprehend it. For movies, this may be indicated by metadata generated by the content provider for the content landing area. For games, this is more complex and may involve selecting a right content type for the advertisement.

For example, based on in-game data coming from the content provider we might prefer to use an audio-only advertisement even if we do have bandwidth because it is more appropriate for the intense gaming environment the user is experiencing. Another challenge for gaming is that a next scene is not pre-determined and it depends on the game player, which contrasts to a movie where motion patterns are known in advance.

Figure 2:
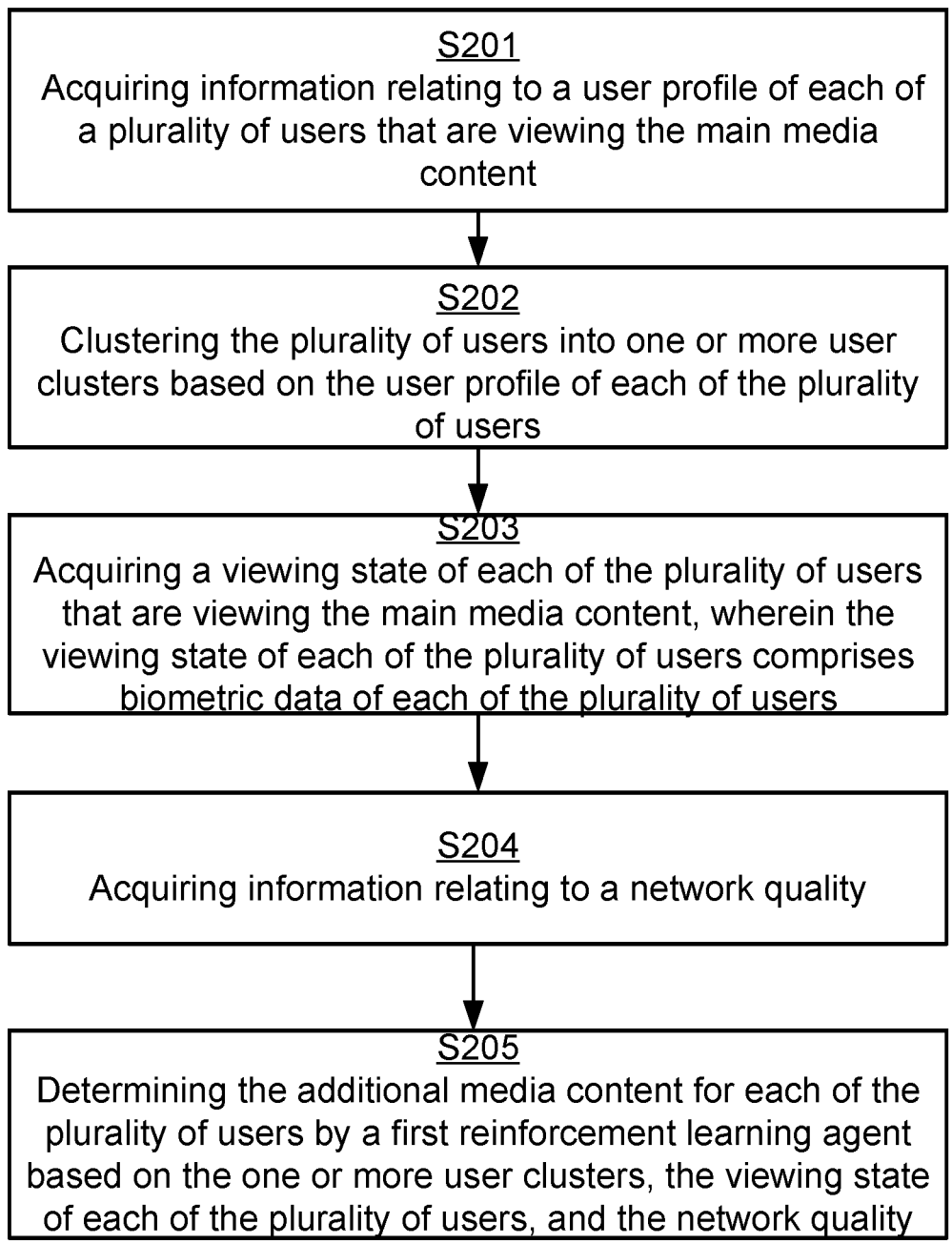
FIG. 2 is a flowchart of a method for determining an additional media content to be inserted into a main media content, according to an embodiment of the invention.

FIG. 2 is a flowchart illustrating an embodiment of a method 200 for determining an additional media content to be inserted into a main media content wherein the main media content is in a virtual environment. The method 200 is performed by a content server 100, or another entity, comprising content server functionality. This method may in some embodiments be executed by a function module named e.g. as a "content determiner".

S201: Acquiring information relating to a user profile of each of a plurality of users that are viewing the main media content.

For each of the plurality of users, the user profile may collect user behaviour to predict user preferences and/or the user may create and customize his/her preferences and settings on an ongoing basis. The user profile may store historical user information. The user profile may comprise a user registry where a unique user identity can be managed. The unique user identity may be associated with a global user profile which is shared across different user applications. The user profile may be updated continuously based on the collected information that can be used to characterize user behaviour. For example, the user profile may comprise user preferences that the user prefers to watch sport programs.

In some embodiments, the user profile of each of the plurality of users comprises at least one of: a service level agreement (SLA) between a service provider and each of the plurality of users, a user preference relating to media content, a user subscription, and a geographical location of each of the plurality of users.

S202: Clustering the plurality of users into one or more user clusters based on the user profile of each of the plurality of users.

For example, the clustering may be based on user preferences. The users that prefer to watch sport programs may be clustered together. The clustering may be based on user subscriptions, so that the users have the same kind of user subscriptions can be clustered together. After clustering the users based on the user profile, it is possible to provide a same kind of advertisement to the users in a cluster so that the bandwidth usage can be optimized. Also, clustering the users can reduce the computation complexity for the first RL agent.

S203: Acquiring information relating to a viewing state of each of the plurality of users, wherein the viewing state of each of the plurality of users comprises biometric data of a user.

A viewing state of a user indicates how the user is viewing/watching the media content. For example, the viewing state may indicate if the user is viewing/watching with concentration or not. The viewing state may indicate the user's emotional response when viewing/watching the media content, for example if the user is happy, sad, nervous, worried, depressed, confused, excited, scared etc. when viewing/watching. The viewing state may further indicate varying intensities of the user's emotional response, such is "a little happy", "very happy", "a little nervous", and "very nervous". The viewing state may comprise information such as presence or absence of the user near a media content viewing end device. In some embodiments the viewing state may be obtained by face recognition, gesture recognition or voice recognition of the viewing user. In some embodiments if there are several users that are viewing the same media content in the same room, the viewing state of each user in the room may be obtained at the same time by applying for example image processing or sound processing. The viewing state may be obtained by a camera, a microphone, a sensor, etc. The viewing state may comprise biometric data of a user and/or any other type of available user specific data. Biometric data of a user means physical or behavioural characteristics specific to the user to be able to authenticate the user's identity.

In some embodiments, the biometric data of the user comprises at least one of: eye movement, pupil dilation, galvanic skin response (GSR), facial expression, body gesture and heart rate. In some embodiments, the biometric data of the user indicates a level of user attention. For example, when a person looks at an object, he or she cognitively processes the object for exactly as long as the recorded fixation. If the person is gazing at an object for a relative long time, it indicates that he is focused on the object and he is interested in the object. In this way gaze direction can be linked to the focus of attention and a level of user attention. The user has greater chance to notice the additional media content if it is placed in an area of a scene where the eyes are gazing. In some embodiments, pupil dilution or being sweaty may be used to judge if a person is nervous. The diameter of pupils may change when players are presented with violent stimuli. It is expected that pupils dilate if a viewer experiences hostile and aggressive emotional responses, which is more likely to occur among players of violent video games. The additional media content may not be noticed by the user if he/she is in a very nervous state when playing a violent video game.

S204: Acquiring information relating to a network quality.

The network quality may be indicated by network quality metrics. For media content delivery services, network quality metrics may include downlink and uplink data speeds and latencies. The network quality metrics may comprise metrics that measure the reliability of the data connection such as the connectivity and maintainability of successful data sessions. In addition, the network quality may be dependent on a service provider's received signal quality, cell traffic loading, network capacity in different locations and the capacity of a user's device for viewing the media content. The network quality may be varying over time and may be monitored continuously.

In some embodiments, the network quality relates to at least one of: a network bandwidth constraint, a network quality at which a content provider delivers the main media content, a capacity at which a user's device renders the main media content. The capacity at which the user device renders the main media content may comprise the capability of the graphics hardware of the user device.

S205: Determining the additional media content by using a first reinforcement learning (RL) agent based on the one or more user clusters, the viewing state of each of the plurality of users and the network quality.

In some embodiments, the method further comprises determining a content type of the additional media content, wherein the content type is at least one of: a two-dimensional (2D) video content, a three-dimensional (3D) video content, an audio content, a 2D image content, a 3D image content, a 2D animated content and a 3D animated content. Different content types may have different requirement regarding bandwidth/latency. For example, an audio content may be determined for the additional media content rather than a 2D or 3D video content, if the bandwidth is limited. In another example, if the user is in a cluster where the user preference is detailed and realistic effects, a 3D animated content may be determined for the additional media content rather than a 2D animated content.

In some embodiments, the method further comprises determining a media quality of the additional media content, wherein the media quality relates to at least one of: a resolution of the additional media content and a level of detail (LoD) of the additional media content. Different resolution and/or different level of details result in a different size of a same media content, which introduces different requirements regarding bandwidth/latency. For example, image size is directly related to image resolution i.e. the higher the resolution, the bigger the file size. In case the network quality is poor, an image with lower resolution may be determined for the additional media content. Another example is for 3D video games, where it is common to have real world scenes that are arbitrarily complicated. Interactive games need a fast frame rate to provide a satisfactory user experience. Graphics hardware is limited in the number of primitives (e.g. triangles) which can be rendered in a given time. Therefore, there is a trade-off between rendering speed and scene complexity. If the graphics hardware of a user device has limited capability, a coarser LoD may be determined for the additional media content.

In some embodiments, the virtual environment is a virtual reality (VR) environment or an augmented reality (AR) environment.

In some embodiments, the virtual environment is a gaming environment. In some embodiments, the virtual environment is at least one of: a VR tour for tourism, a VR tour for equipment inspection, a VR tour for equipment installation, a VR tour for equipment start manual, a VR tour for shopping, and a VR classroom. For example, in a VR based guided tour, when the user is moving from one site to another site, advertisement may be inserted into the guided tour.

In some embodiments, when the virtual environment is a gaming environment, audio content may be assigned a higher reward than any other type of media content if the level of user attention is over a threshold. In this scenario, even it is possible to insert a video content based on the bandwidth requirement, since the user is very concentrated in the gaming environment and may not want to be disturbed by further watchable content, an audio content may be selected.

In some embodiments, the additional media content is an advertisement.

In some embodiments, the additional media content is additional instructions. For example, if the biometric data of a user indicates that the user seems nervous or confused when viewing a VR tour for equipment installation, additional detailed instructions may be provided to help the user to follow instructions. In another example, if the virtual environment is a VR classroom and the user is a student, additional instructions as explanations may be provided to the student if the biometric data indicates that the student is confused. The user profile of the student may reflect a level of familiarity of a subject. In these scenarios if the user is a service maintenance/installation personal, different user profiles may reflect different level of experience and certified skill on specific equipment to be handled.

The skilled person will be familiar with reinforcement learning and reinforcement learning agents. However, briefly, reinforcement learning is a type of machine learning process whereby a reinforcement learning agent (e.g. algorithm) is used to take decisions (e.g. perform actions) on a system to adjust the system according to an objective (which may, for example, comprise moving the system towards an optimal or preferred state of the system). The reinforcement learning agent receives a reward based on whether the action changes the system in compliance with the objective (e.g. towards the preferred state), or against the objective (e.g. further away from the preferred state). The reinforcement learning agent therefore adjusts parameters in the system with the goal of maximising the rewards received.

Put more formally, a reinforcement learning agent receives an observation from the environment in state S and selects an action to maximize the expected future reward r. Based on the expected future rewards, a value function V for each state can be calculated and an optimal policy $\pi$ that maximizes the long term value function can be derived.

In the context of this disclosure, a content server and its surroundings (e.g. a system comprising or having access to a content server) may comprise the "environment" in the state S. A state S may be defined by a network quality, such as a network bandwidth availability, a viewing state of a user, and a user cluster's status. The viewing state of a user may be measured among other by the biometric data of the user. The biometric data may indicate a user's response to the additional media content, for example, if the user has paid attention to the additional media content or not. The user cluster's status may include a ranking of the user cluster based on for example SLA between the user and the service provider. One example of a state for a user is network quality: Good; user cluster: top cluster, being interested in sport and prefers 3D animation; Viewing state: High attention. Top cluster may indicate that the user has a user subscription type that high quality media content should be provided. In some embodiments, information relating to cluster adherence may be used to indicate quality of experience (QoE), which can further be used as part of the reward function of the first RL agent. For example, if the user belongs to a specific user cluster, the additional media content inserted to the main media content for the user may be compared with the determined additional media content for the specific user cluster by the first RL agent, and the differences between these two additional media contents may be calculated by a distance metric to indicate how good or bad the cluster adherence is. If the additional media content inserted to the main media content is similar to the determined additional media content for the specific user cluster, the user is considered to have a high cluster adherence to the specific user cluster, which indicates good QoE.

"Actions" performed by a reinforcement learning agent comprise the decisions or determinations made by the reinforcement agent as to whether a new additional media content and/or a new type of the same additional media content should be provided to a user. Generally, the reinforcement learning agent herein receives feedback in the form of a reward or credit assignment every time it makes a determination (e.g. every time the RL agent instigates an action). A reward is allocated depending on the goal of the system. For example, and as will be discussed in detail below, rewards may be allocated according to whether decisions (e.g. actions) result in increased or reduced user response, increased or reduced latency etc. The user response may be indicated by the biometric data of a user. The relative sizes and signs (e.g. whether a numerical value of, or associated with, a reward is positive or negative) of a reward may be tuned so as to optimise user response whilst reducing latency. As noted above, generally, the goal of the reinforcement learning agents herein is to maximise the reward received. For this specific example, a sport brand may be determined to be inserted into the main media content as an 3D animation for users in the same cluster.

Any reinforcement learning method may be used, such as, for example, a Q-learning method, an actor-critic method, a Sarsa (on-policy Temporal-Difference (TD) control) method, a deep Q-learning (DQN) method or a Multi Armed Bandit method. In some embodiments, the reinforcement learning method may employ a Markov Decision Process (MDP).

Figure 3:
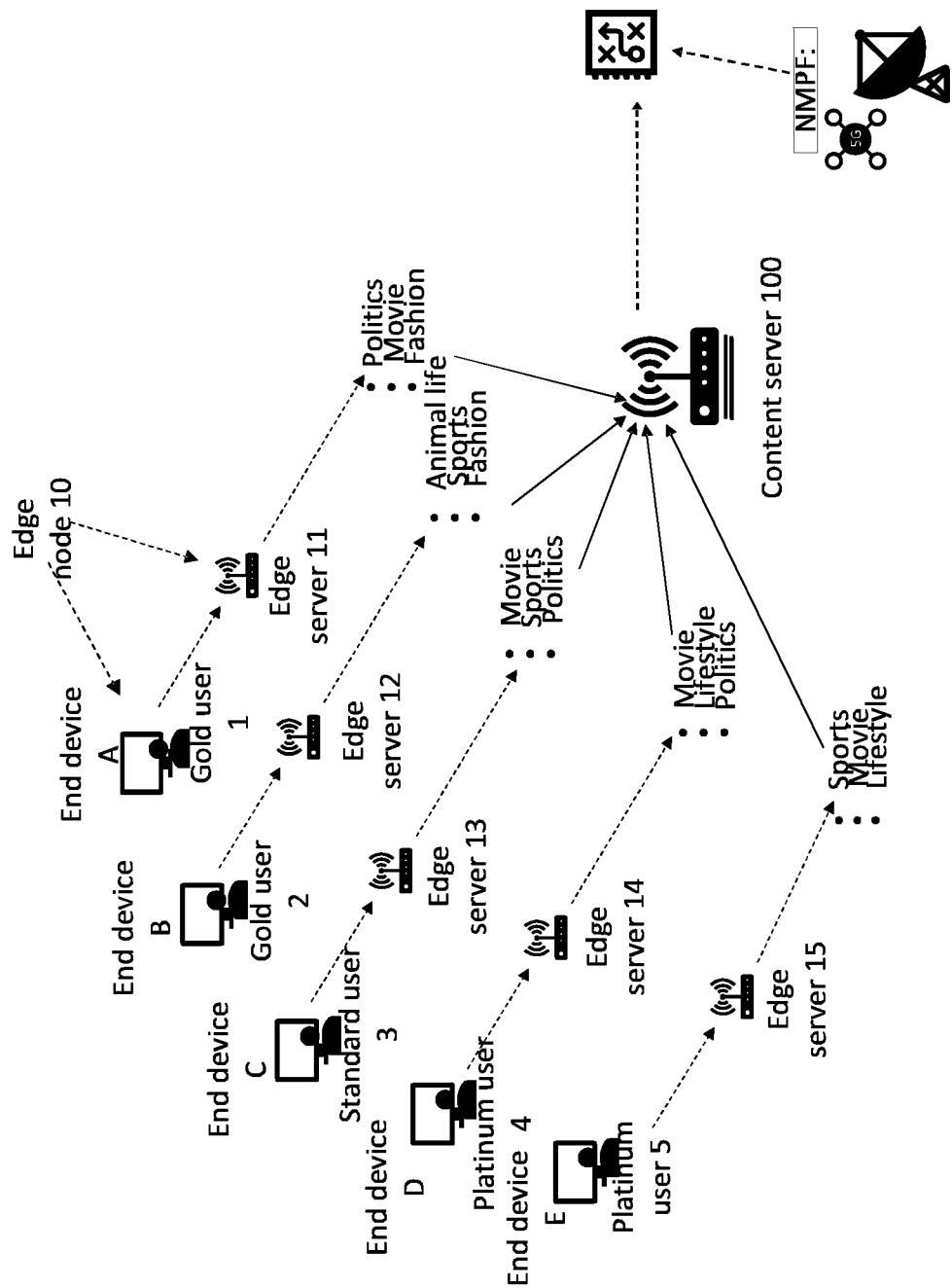
FIG. 3 schematically illustrates an example according to an embodiment of the invention.

FIG. 3 schematically illustrates one example of users with different user profiles. There are five users shown in FIG. 3 for illustration purpose, that is, the Gold user 1, Gold user 2, Standard user 3, Platinum user 4 and Platinum user 5. "Standard user", "Gold user" and "Platinum user" represent different user subscription types. Different service quality and capability may be provided for each user subscription type. The different user subscriptions may include different bandwidth guarantee, different latency guarantee, different access priority etc. For example, Gold user 1 may obtain less latency at additional cost than Standard user 3. The users may have different user preferences. For example, Gold user 1 may be interested in politics, movie and fashion. Gold user 2 may be interested in animal life, sports and fashion. Standard user 3 may be interested in movie, sports and politics. Platinum user 4 may be interested in movie, lifestyle and politics. Platinum user 5 may be interested in sports, movie and lifestyle. The user preferences may be acquired by analysing the media content that the user views most frequently.

The information relating to user profiles, such as user preferences, may be collected at an edge node 10, which may be any end-user device/end device, edge server, or edge gateway, by analysing the content the user has viewed. An end device may be a set-top-box, mobile phone/smart phone, computer, laptop computer, tablet, internet-connected television, digital video recorder, and a VR Head Mounted Display (HMD)/headset. The end devices A, B, C, D and E are used by the Gold user 1, Gold user 2, Standard user 3, Platinum user 4 and Platinum user 5 respectively for illustration purpose. The edge servers 11, 12, 13, 14, 15 are connected to the Gold user 1, Gold user 2, Standard user 3, Platinum user 4 and Platinum user 5 respectively for illustration purpose. The edge servers may be further connected to a content server 100. The information relating to user profiles may be sent to the content server 100.

In this illustrated example a network monitoring and prediction function (NMPF) may be used to monitor the network quality. NMPF is only used for illustration purpose. Different network functions may be implemented for collecting data from performance monitor (PM) counters to monitor a network and to predict the network quality.

FIG. 4 is a flowchart illustrating an embodiment of a method 400 for inserting an additional media content into a main media content wherein the main media content is in a virtual environment. The method 400 is performed by an edge node 10. This method may in some embodiments be executed by a function module named e.g. as "a content inserter".

S401: acquiring information relating to a user profile of at least one user that is viewing the main media content;

S402: acquiring a viewing state of the at least one user, wherein the viewing state of the at least one user comprises biometric data of the at least one user;

S403: acquiring information relating to a network quality;

S404: receiving a determination of the additional media content for the at least one user;

As mentioned above, the determination of the additional media content may comprise the determination of a content type of the additional media content, wherein the content type is at least one of: a two-dimensional (2D) video content, a three-dimensional (3D) video content, an audio content, a 2D image content, a 3D image content, a 2D animated content and a 3D animated content.

In some embodiments the determination of the additional media content may comprise the determination of a media quality of the additional media content, wherein the media quality relates to at least one of: a resolution of the additional media content and a level of detail (LoD) of the additional media content.

S405: acquiring the additional media content;

The additional media content may be acquired from a content provider of additional media content.

S406: determining a position and a time slot to insert the additional media content into the main media content by a second reinforcement learning agent based on the viewing state of the at least one user, the user profile of the at least one user that is viewing the main media content and the network quality.

In some embodiments, the method further comprises inserting the additional media content to the main media content.

In some embodiments, the virtual environment is a gaming virtual environment, and the determining a position and a time slot to insert the additional media content to the main media content further comprises receiving a prediction of a position of the at least one user in a next scene of the gaming virtual environment from a main content server. In some embodiment Markov Decision Processes may be combined with reinforcement learning to calculate the probability of the next slot in a game.

In some embodiments the virtual environment may be a VR tour which may be used for equipment inspection, equipment installation, equipment use instruction, shopping, tourism etc. For example, in a VR based guided tour, when the user is moving from one site to another site, advertisement may be inserted into the guided tour. The additional media content may be additional instructions when the VR tour is for equipment installation. The virtual environment may be a VR classroom for education purpose and the additional media content may be additional learning material.

In some embodiments, the additional media content may be advertisement. In some embodiments may be additional instructions. For example, if the biometric data of a user indicates that the user seems nervous or confused when viewing a VR tour for equipment installation, additional detailed instructions may be provided to help the user to follow instructions. In another example, if the virtual environment is a VR classroom and the user is a student, additional explanations may be provided to the student if the biometric data indicates that the student is confused. The user profile of the student may reflect a level of familiarity of a subject. In these scenarios if the user is a service maintenance/installation personal, different user profiles may reflect different level of experience and certified skill on specific equipment to be handled.

In some embodiments, the inserting the additional media content into the main media content further comprises inserting a same additional media content into the main media content for a number of users. As mentioned above, in the example when network quality: Good; user cluster: Top cluster, being interested in sport and prefers 3D animation; Viewing state: High attention, a sport brand advertisement in 3D animation may be inserted for a number of users within the cluster. In some embodiments, information relating to cluster adherence may be used to indicate quality of experience (QoE), which can further be used as part of the reward function of the second RL agent.

In some embodiments, the biometric data of the user comprises at least one of: eye movement, pupil dilation, galvanic skin response (GSR), facial expression, body gesture and heart rate.

In some embodiments, the biometric data of the user indicates a level of user attention.

In some embodiments, the biometric data of the user indicates a level of nervousness. when the virtual environment is a gaming environment and the user is playing a violent game, if it is indicated by the biometric data of the user that the user's nervousness has reached a certain level, a placement of the additional media content may be assigned a lower reward, since the user may not notice the additional media content at all.

In some embodiments, the network quality relates to at least one of: a network bandwidth constraint, a network quality at which a content provider delivers the main media content, a network quality at which a render device renders the main media content.

In the context of this disclosure, for the second reinforcement learning agent, an edge node and its surroundings (e.g. a system that the content server is within) may comprise the "environment" in the state S. A state S may be defined by a network quality, such as a network bandwidth availability, a viewing state of a user, and a user profile. The viewing state of a user may be measured among other by the biometric data of the user. The biometric data may indicate a user's response to the additional media content, such as, if the user has paid attention to the additional media content or not, and if the user has enjoyed the additional media content or not.

"Actions" performed by a second reinforcement learning agent comprise the decisions or determinations made by the second reinforcement agent as to when and where the additional media content should be provided to a user. Generally, the reinforcement learning agent herein receives feedback in the form of a reward or credit assignment every time it makes a determination (e.g. every time the RL agent instigates an action). A reward is allocated depending on the goal of the system. For example, rewards may be allocated according to whether decisions (e.g. actions) result in increased or reduced user response, increased or reduced latency. The relative sizes and signs (e.g. whether a numerical value of, or associated with, a reward is positive or negative) of a reward may be tuned so as to optimise user response whilst reducing latency. As noted above, generally, the goal of the reinforcement learning agents herein is to maximise the reward received.

As mentioned earlier, the second RL agent may be executed by a function module "a content inserter" while the first RL agent may be executed by a function module "a content determiner". "The content inserter" may need to act fast and in a predictable way (near real-time even) so that the additional media content can be inserted without negatively affecting the user's viewing experience. "The content determiner" has more time to make a decision and may determine the additional media content for a later time. Also, in some embodiments the "content determiner" considers a larger group of user and clusters them, while "the content inserter" may be responsible for a single or a small group of users.

Any reinforcement learning method may be used for the second reinforcement learning agent, such as, for example, a Q-learning method, an actor-critic method, a Sarsa (on-policy Temporal-Difference (TD) control) method, a deep Q-learning (DQN) method or a Multi Armed Bandit method.

In some embodiments, the reinforcement learning method may employ a Markov Decision Process (MDP).

In some embodiment the MDP may be used to indicate which kind of content types are feasible based on the probability of certain types of content slots and the network constraints/qualities MDP may be used together with a knowledge base and business intents to explain the chosen actions of the first or the second RL agent. For example, instead of simply choosing the action with the highest reward, the top three actions with the highest rewards together with the probabilities of the resulting states of these actions may be shown.

In some embodiments the edge node is an edge server. In some embodiments the edge server may insert the same additional media content to a number of users based on SLA requirement. If there are a number of users that can be served the same (heavy, network-intensive) additional media content, the same additional media content may be moved in a time sequence a number of times to serve the number of uses instead of being fetched from the content server a number of times. In this way, bandwidth may be saved to increase quality of the additional media content.

In some embodiments the method comprises receiving feedback from the content server about the current and predicted location of a user. In some embodiments the biometric data of the a least one user indicates a user response to the additional media content, for example if the user has paid attention to the additional media content or not, and if the user has enjoyed the additional media content or not.

In some embodiments semantic matching is used to get initial proposal list of the additional media content. In some embodiments a semantic model may be used to describe constrains and a budget of the additional media content.

Figure 5:
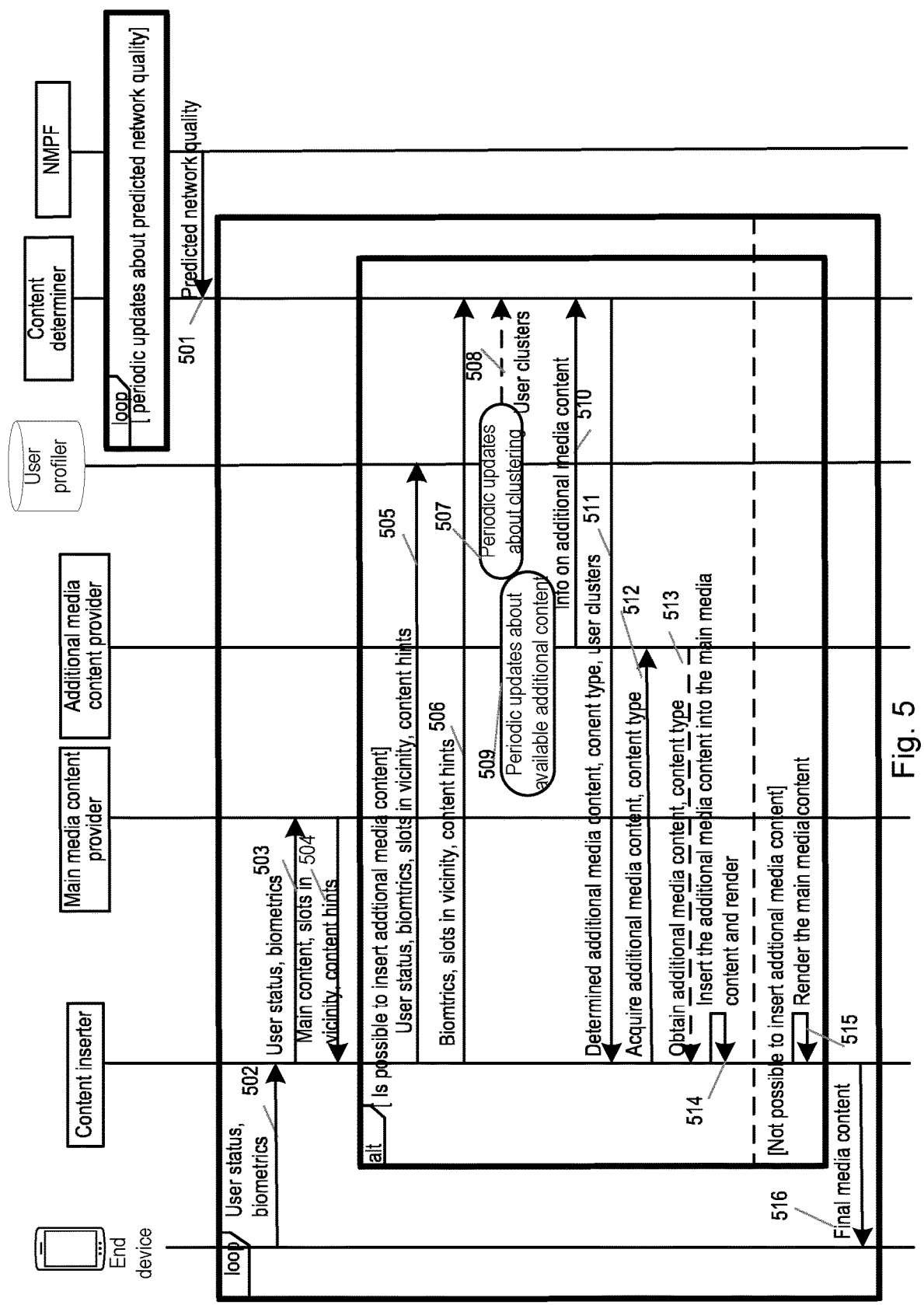
FIG. 5 is a signal flow diagram illustrating an example of a process for determining and inserting an additional media content into a main content.

FIG. 5 is a sequence diagram illustrating an example of a process performed by a content server and an edge node to render the media content to a user.

In step S501, a NMPF monitors the network quality and send the network quality to a content determiner. The network quality may be predicted and updated periodically. In step S502, an end device of a user sends biometric data and of the user indicating the viewing state of the user viewing a main media content to a content inserter. Data indicating user status when viewing the main media content may also be sent to the content inserter. For example, in a gaming environment, the user status may indicate mission completeness of the user, navigating status of the user in a map etc. If the user is viewing a video, the user status may indicate which video frame the user is viewing. The method 200 may be executed by the function module "a content inserter". As mentioned, the content inserter may be implemented in the end device or in an edge server. However, the content inserter is preferred to be implemented in an edge server if the end device has limited computation capacity. In step S503, the content inserter may send biometric data of the user, and the user status to a main media content provider. In step S504, the main media content provider sends a main media content to be rendered to the content inserter. The main media content provider may send information relating to slots in vicinity, content hints together with the main media content. In a gaming environment, information relating to slots in vicinity may be spatial and temporal vicinity in the game, for example, when the user is about to walk in an area or is about to reach a key point in time, information relating to the area or the key point may be sent. If the user is viewing a video, slots in vicinity may relate to the slots that will become comprehensible (such as visible, auditive). Content hints relate to content that may appear in the next scene. In step S505, the biometric data of the user, the user status, the slots in vicinity, and the content hints may be sent to a user Profiler, where interpretation of the biometric data may be combined with content hints. For example, content hints may indicate that the user is playing an intensive game. In the intensive game it is expected that the user will show the emotional response of being excited. The combination of biometric data of the user and the content hints may indicate that the user is in a visually intense area, where an audio content may be preferred than image or video content to prevent distracting the user. In step S506, the biometric data, and information relating to slots in vicinity and content hints may be sent to the content determiner. In step S507, in the user profiler, the users are clustered into one or more user clusters and the user clusters are updated periodically. In step S508, the user clusters are sent from the user profiler to the content determiner. In step S509, in the additional media content provider, the available additional media content is updated periodically. In step S510, in the additional media content provider, the information regarding available additional media content is sent to the content determiner. In step S511, the content determiner executes the method 200 described above, and sends the determined additional media content, a content type of the additional media content, the user clusters to the content inserter. In step S512, the content inserter acquires the determined additional media content and the content type from the additional media content provider. In step S513, the additional media content is sent to the content inserter from the additional media content provider. In Step S514, in the content inserter, the method 400 described above is executed, and the additional media content is inserted into the main media content. In case it is not possible to insert the additional media content to the main media content, in step S515, only the main media content is rendered. In step S516, the final media content (with or without inserted additional media content) is send to the end device of the user.

Figure 6:
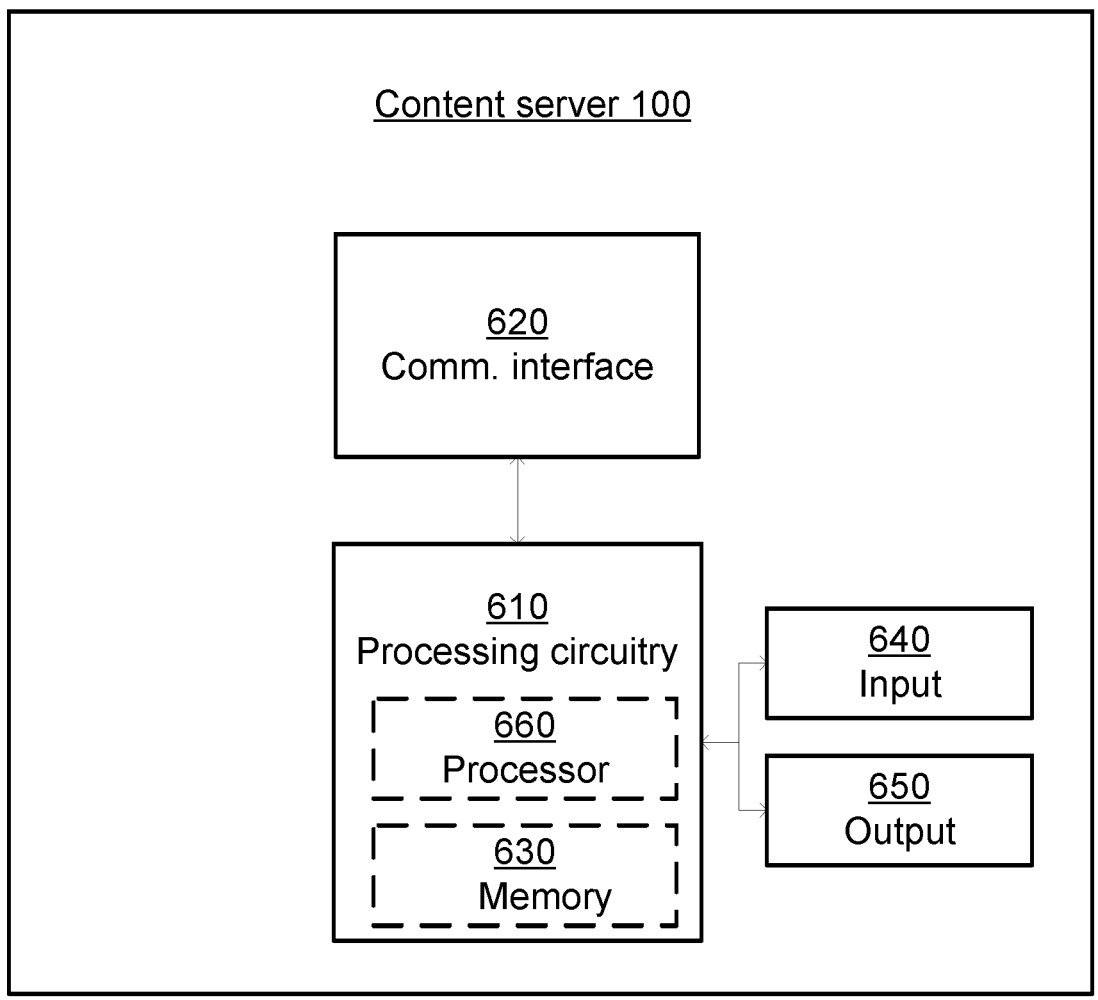
FIG. 6 schematically illustrates a content server for determining an additional media content to be inserted to a main content, according to an embodiment of the invention.

FIG. 6 schematically illustrates, in terms of a number of functional units, the components of a content server 100 according to an embodiment. Processing circuitry 610 is provided using any combination of one or more of a suitable central processing unit (CPU), multiprocessor, microcontroller, digital signal processor (DSP), etc. The processing circuitry 610 may comprises a processor 660 and a memory 630 wherein the memory 630 contains instructions executable by the processor 660. The processing circuitry 610 may further be provided as at least one application specific integrated circuit (ASIC), or field programmable gate array (FPGA). The voice-controlled device 100 may comprise input 640 and output 550.

The content server 100 may further comprise a communication interface 620. The communication interface 620 may support various communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. Particularly, the processing circuitry 610 is configured to cause the content server 100 to perform a set of operations, or steps, as disclosed above. For example, the memory 630 may store the set of operations, and the processing circuitry 610 may be configured to retrieve the set of operations from the memory 630 to cause the voice-controlled device 100 to perform the set of operations. The set of operations may be provided as a set of executable instructions.

Thus the processing circuitry 610 is thereby arranged to execute methods as herein disclosed. The memory 630 may also comprise persistent storage, which, for example, can be any single one or combination of magnetic memory, optical memory, solid state memory or even remotely mounted memory.

Figure 7:
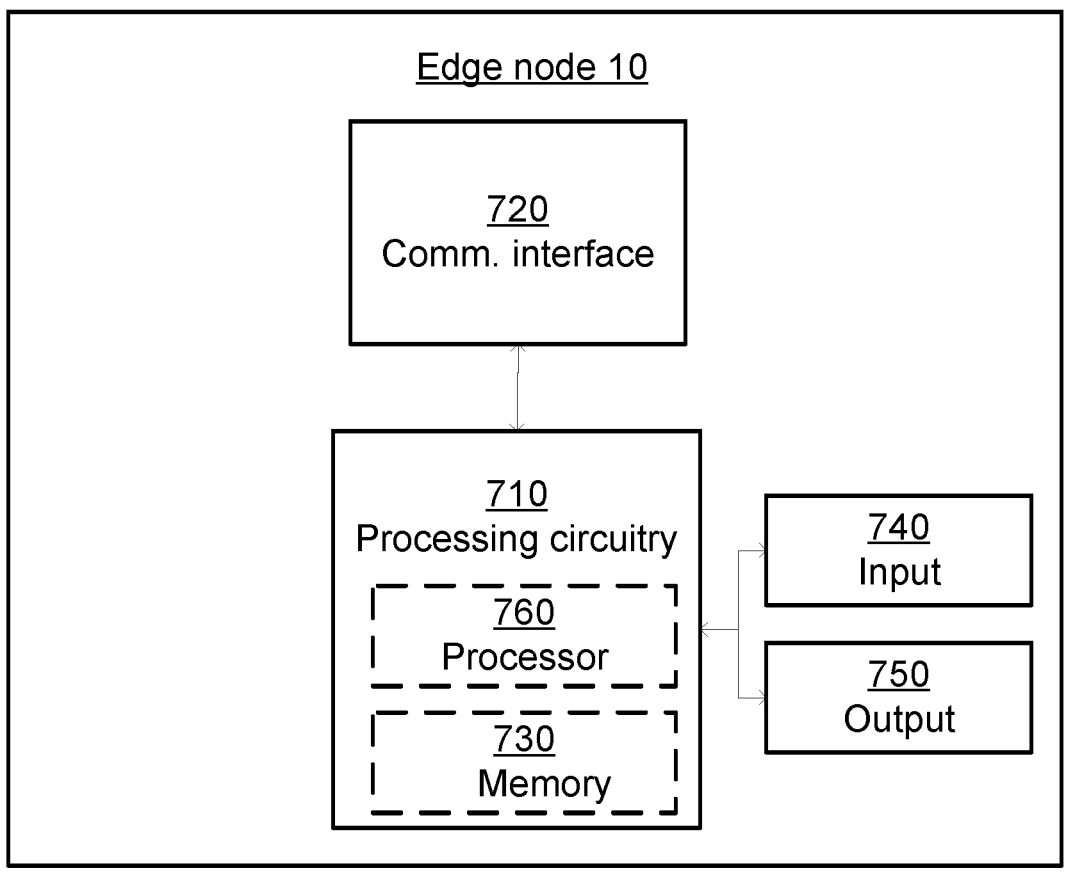
FIG. 7 schematically illustrates an edge node for inserting an additional media content into a main content, according to an embodiment of the invention.

FIG. 7 schematically illustrates, in terms of a number of functional units, the components of an edge node 10 according to an embodiment. Processing circuitry 710 is provided using any combination of one or more of a suitable central processing unit (CPU), multiprocessor, microcontroller, digital signal processor (DSP), etc. The processing circuitry 710 may comprises a processor 760 and a memory 730 wherein the memory 730 contains instructions executable by the processor 760. The processing circuitry 710 may further be provided as at least one application specific integrated circuit (ASIC), or field programmable gate array (FPGA). The voice-controlled device 100 may comprise input 740 and output 750.

The edge node 10 may further comprise a communication interface 720. The communication interface 720 may support various communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. Particularly, the processing circuitry 710 is configured to cause the edge node to perform a set of operations, or steps, as disclosed above. For example, the memory 730 may store the set of operations, and the processing circuitry 710 may be configured to retrieve the set of operations from the memory 730 to cause the voice-controlled device 100 to perform the set of operations. The set of operations may be provided as a set of executable instructions.

Thus the processing circuitry 710 is thereby arranged to execute methods as herein disclosed. The memory 730 may also comprise persistent storage, which, for example, can be any single one or combination of magnetic memory, optical memory, solid state memory or even remotely mounted memory.

Figure 8:
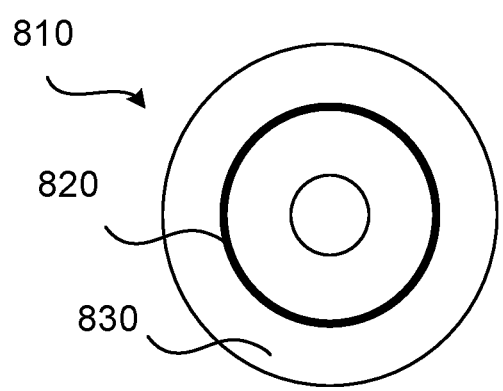
FIG. 8 shows an embodiment of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 610 or 710 and thereto operatively coupled entities and devices, such as the communications interface 620 or 720, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810. A carrier may contain the computer program 820, wherein the carrier is one of an electronic signal, an optical signal, a radio signal, and a computer readable storage medium 830.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining an additional media content to be inserted into a main media content wherein the main media content is in a virtual environment, the method being performed by a content server and comprising:
   acquiring information relating to a user profile of each of a plurality of users that are viewing the main media content;
   clustering the plurality of users into one or more user clusters based on the user profile of each of the plurality of users, wherein the plurality of users are clustered based on user preferences and/or user subscriptions;
   acquiring a viewing state of each of the plurality of users that are viewing the main media content, wherein the viewing state of each of the plurality of users comprises biometric data of each of the plurality of users;
   acquiring information relating to a network quality;
   determining the additional media content for each of the plurality of users by a reinforcement learning (RL) agent based on the one or more user clusters, the viewing state of each of the plurality of users, and the network quality; and
   determining a position in the virtual environment and a time slot to insert the additional media content into the main media content.

2. The method of claim 1, wherein the determining the additional media content for each of the plurality of users further comprises:
   determining a content type of the additional media content, wherein the content type is: a two-dimensional (2D) video content, a three-dimensional (3D) video content, an audio content, a 2D image content, a 3D image content, a 2D animated content, or a 3D animated content.

3. The method of claim 1, wherein the determining the additional media content for each of the plurality of users further comprises:
   determining a media quality of the additional media content, wherein the media quality relates to: a resolution of the additional media content and/or a level of detail (LoD) of the additional media content.

4. The method of claim 1, wherein
   the biometric data of each of the plurality of users comprises: eye movement, pupil dilation, galvanic skin response (GSR), facial expression, body gesture, and/or heart rate, and/or
   the biometric data of each of the plurality of users indicates a level of user attention.

5. The method of claim 1, wherein the network quality relates to: a network bandwidth constraint, a network quality at which a content provider delivers the main media content, and/or a capacity at which a device renders the main media content.

6. The method of claim 1, wherein the user profile of each of the plurality of users comprises: a service level agreement (SLA) between a service provider and each of the plurality of users, a user preference relating to media content, a user subscription, and/or a geographical location of each of the plurality of users.

7. The method of claim 1, wherein
   the virtual environment is a virtual reality (VR) environment or an augmented reality (AR) environment, and
   the additional media content comprises an advertisement and/or additional instructions.

8. The method of claim 1, wherein the virtual environment is: a virtual reality (VR) tour for tourism, a VR tour for equipment inspection, a VR tour for equipment installation, a VR tour for equipment start manual, a VR tour for shopping, a gaming environment, and/or a VR classroom.

9. The method of claim 1, wherein the audio content is assigned a higher reward than any other type of media content as a result of the level of user attention being over a threshold.

10. A method for inserting an additional media content into a main media content wherein the main media content is in a virtual environment, the method being performed by an edge node and comprising:
    acquiring information relating to a user profile of a user that is viewing the main media content;
    acquiring a viewing state of the user, wherein the viewing state of the user comprises biometric data of the user;
    acquiring information relating to a network quality;
    receiving a determination of the additional media content for the user;
    acquiring the additional media content; and
    determining a position in the virtual environment and a time slot to insert the additional media content into the main media content by a reinforcement learning agent based on: the viewing state of the user, the user profile of the user, and the network quality.

11. The method of claim 10, wherein the method further comprises inserting the additional media content into the main media content.

12. The method of claim 10, wherein
    the virtual environment is a gaming virtual environment, and
    the determining a position in the virtual environment and a time slot to insert the additional media content into the main media content further comprises:
    receiving a prediction of a position of the user in a next scene of the gaming virtual environment.

13. The method of claim 10, wherein the virtual environment is: a virtual reality (VR) tour for tourism, a VR tour for equipment inspection, a VR tour for equipment installation, a VR tour for equipment start manual, a VR tour for shopping, and/or a VR classroom, and wherein the additional media content comprises an advertisement and/or additional instructions.

14. The method of claim 11, wherein the inserting the additional media content into the main media content further comprises inserting a same additional media content into the main media content for a number of users.

15. The method of claim 10, wherein
    the biometric data of the user comprises: eye movement, pupil dilation, galvanic skin response (GSR), facial expression, body gesture, and/or heart rate, and/or the biometric data of the user indicates a level of user attention.

16. The method of claim 10, wherein the biometric data of the user indicates a level of user attention.

17. The method of claim 10, wherein the network quality relates to: a network bandwidth constraint, a network quality at which a content provider delivers the main media content, and/or a capacity at which a device renders the main media content.

18. A content server for determining an additional media content to be inserted into a main media content wherein the main media content is in a virtual environment, the content server comprising a processing circuitry causing the content server to be operative to:
    acquire information relating to a user profile of each of a plurality of users that are viewing the main media content;
    cluster the plurality of users into one or more user clusters based on the user profile of each of the plurality of users, wherein the plurality of users are clustered based on user preferences and/or user subscriptions;
    acquire a viewing state of each of the plurality of users that are viewing the main media content, wherein the viewing state of each of the plurality of users comprises biometric data of each of the plurality of users;
    acquire information relating to a network quality;
    determine the additional media content for each of the plurality of users by a reinforcement learning agent based on the one or more user clusters, the viewing state of each of the plurality of users, and the network quality; and
    determine a position in the virtual environment and a time slot to insert the additional media content into the main media content.

19. An edge node for inserting an additional media content into a main media content wherein the main media content is in a virtual environment, the edge node comprising a processing circuitry causing the edge node to be operative to:
    acquire information relating to a user profile of a user that is viewing the main media content;
    acquire a viewing state of the user, wherein the viewing state of the user comprises biometric data of the user;
    acquire information relating to a network quality;
    receive determination of the additional media content for the user;
    acquire the additional media content; and
    determine a position in the virtual environment and a time slot to insert the additional media content into the main media content by a reinforcement learning agent based on the viewing state of the user, the user profile of the user that is viewing the main media content and the network quality.

20. A non-transitory computer readable storage medium storing a computer program comprising instructions, executable by processing circuitry of a content server, for configuring the content server to perform the method of claim 1.

21. The method of claim 1, wherein
    the plurality of users includes a first user,
    the user profile for the first user includes service level agreement (SLA) information pertaining to a SLA between the first user and a service provider and user preference information indicating a content preference of the first user,
    clustering the plurality of users into one or more user clusters based on the user profile of each of the plurality of users comprises assigning the first user to a particular cluster based on the SLA between the first user and the service provider,
    the viewing state acquired for the first user indicates a level of the user's attentiveness, and
    determining the additional media content for the first user comprises selecting the additional media content for the first user based on i) a ranking of the particular cluster to which the user is assigned, ii) the level of the user's attentiveness, and iii) the first user's content preference.

22. The method of claim 1, wherein
    the plurality of users includes a first user,
    the user profile for the first user includes service level agreement (SLA) information pertaining to a SLA between the first user and a service, and
    clustering the plurality of users into one or more user clusters based on the user profile of each of the plurality of users comprises assigning the first user to a particular cluster based on the SLA between the first user and the service provider.

23. The method of claim 1, wherein
    the plurality of users includes a first user,
    the viewing state acquired for the first user indicates a level of the user's attentiveness, and
    determining the additional media content for the first user comprises selecting the additional media content for the first user based on i) a ranking of the particular cluster to which the user is assigned, and ii) the level of the user's attentiveness.

* * * * *